1

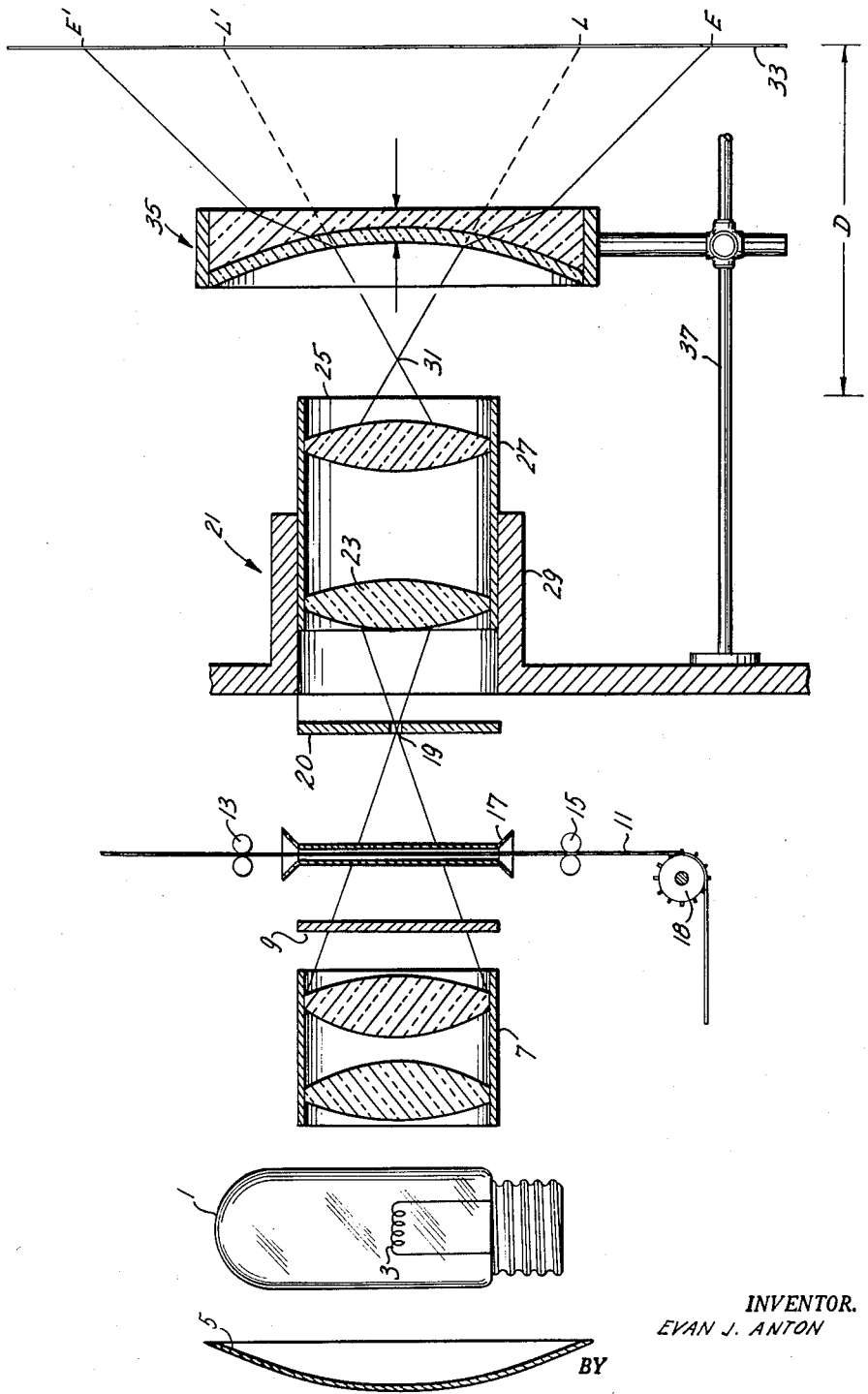

3,178,996
OPTICAL PROJECTION SYSTEM WITH NEGATIVE DIOPTER MAGNIFYING LENS
Evan J. Anton, 43—14 60th St., Woodside,
Long Island, N.Y.
Filed Feb. 10, 1961, Ser. No. 88,412
1 Claim. (Cl. 88—24)

This invention relates to optical projection systems for viewing photographic film transparencies.

In present-day motion picture or slide film projectors, the maximum magnification of a projected optical image of a photographic film is determined by the size of the film, the focal length of the optical projection system, and the projection distance to a projection screen. A slight increase in magnification of the projected image is often effected by relocating the projector to increase projection distance. However, if the focal length of the optical system is not sufficiently short to focus this projected image, a loss of definition, softness of focus, and increased graininess result which deteriorate the quality of the projected image and cause annoyances to a viewer. Whether a variable-focus or zoom-type optical projection system is employed, the resultant increase in image magnification is generally and practically limited to 1½ time magnification.

The provision of optical projection systems of very short focal length, i.e. wide angle systems, in motion picture projectors to effect maximum possible image magnification is, in most instances, not practical. Moreover, the permissive re-location of a motion picture projector to increase projection distance is hardly enough to effect a noticeable increase of image size. For example, commercial motion picture projectors of the type employed in theatres are large cumbersome devices usually located in restricted quarters. Accordingly, larger-size film, e.g. 70 mm. rather than 35 mm., is often employed where projected images of larger size are desired. However, this approach to large size image projection is objectionably expensive as the cost, for example, of producing a 70 mm. film is approximately 7 times the cost of producing a standard size 35 mm. film. In addition, the cost of release prints of this larger-size print is correspondingly increased.

Therefore, there is a need in the motion picture art of an inexpensive, wide angle optical system for projecting highly magnified, high quality images of photographic film transparencies.

This need is satisfied in accordance with the principles of this invention by incorporating with the primary optical system of a motion picture projector, regardless of type, a secondary lens system having a minus diopter power curve, e.g. a plano-concave lens. This secondary lens system is positioned beyond the focal point of the existing primary optical system so as to intercept a fully formed and correctly inverted image; due to the refractive properties of the secondary lens system, this image is highly magnified and projected without further inversion and free of distortion onto a projection screen. In effect, therefore, the combination of the primary and secondary lens system provides an optical projection system of very short focal length as compared to the focal length of the primary lens system.

The novel optical projection system of this invention provides numerous advantages primarily among which is that the degree of magnification of the projected image, is for all practical purposes, limited only by the size of the projection screen and also the amount of illumination available within the projector. The size of the projected magnification is continuously controlled by varying the spacing between the primary lens system and the secondary lens system; moreover, as the secondary lens system may be of simple construction, a focusing of the projected image can be effected in the usual manner by an adjustment of the existing primary lens system of the projector.

With fixed-light-source projectors having commercially available primary lens systems, e.g. a Petzval-type lens system, usable images have been projected more than 16 times normal magnification by incorporating therewith a secondary lens system in accordance with the principles of this invention. Also, in theatres using variable light-source-projectors, usable images having been projected which could not be contained over the entire front of the theatre wall.

A fuller appreciation of this invention along with further advantages thereof, will become apparent to one skilled in the art upon a consideration of the following detailed description in conjunction with the accompanying drawing which illustrates a typical motion picture projector embodying the principles of this invention.

In the drawing, illumination from a light source 1 having a filament 3 is reflected from a parabolic mirror 5 and collimated by a condenser lens arrangement 7. The collimated light is directed through a shutter 9 and passes through a photographic film 11. The film 11 contains a series of animating photographs or pictures and is intermittently pulled downward through a pair of guide rollers 13 and 15 and a film gate 17 by a sprocket wheel 18. In passing through the film gate 17, each picture is illuminated in very rapid succession and images thereof projected in turn through the small aperture 19 of diaphragm 20 of an existing primary lens system, generally indicated at 21, of the motion picture projector. The shutter 9 compensates, in a well known manner, for the intermittent movement of the film 11 through the film gate 17.

The primary lens system 21 may be, for example, a Petzval-type lens system illustrated as comprising a pair of bi-convex lenses 23 and 25 supported in a lens barrel 27, which is telescoped in a lens barrel housing 29. However, it will become evident that numerous other types of primary lens systems may be substituted in the practice of this invention. The optical image is fully formed by the primary lens system 21 is properly inverted at the focal point 31 and would normally be projected onto the screen 33. A focusing of the projected image on the screen 33 is effected by axially adjusting the lens barrel 27 within the barrel housing 29. Accordingly, at a fixed projection distance D, the size of the image normally projected by the primary lens system 21 onto the screen 33 is indicated as L–L′.

However, to effect a marked increased magnification of the projected image at a same projection distance D in accordance with this invention, a secondary lens system 35 having a minus diopter power curve is optically aligned with and positioned beyond the focal point 31 of the primary lens system 21. The secondary lens system 35 is illustrated as comprising a planoconcave lens which is slideably mounted on a support arm 37. To reduce chromatic aberration, the plano-concave lens 35 may be manufactured as a compound of two or more segments of different glass. A fully formed and properly inverted image, therefore, is intercepted on the concave face of the plano-concave lens 35 and project without further inversion onto the screen 33. This image is so diverged and refracted by the plano-concave lens 35 as to produce a greatly enlarged image without reducing the brilliance of the resulting screen image below usable brilliance. The height of the resulting image projected onto the screen 33 is indicated as E–E′.

The size of the projected image E–E′ may be continuously controlled by displacing the secondary lens system 35 along the support arm 37 toward or away from the focal point 31 of the primary lens system 21. Once the desired height E–E' of the projected image is established, a focusing of this image on the screen 33 is effected by axially adjusting the lens barrel 27 in well known manner. The provision of the secondary lens system 35, therefore, introduces no additional focusing problems and yet provides a very substantial increased magnification of the projected image.

The plano-concave lens 35 employed in the practice of this invention preferably should be of sufficient diameter to intercept the entire projected image so as to prevent spillage; the peripheral configuration of the plano-concave lens is optional. However, the minus diopter power curve of the lens 35 should be such that its center thickness should not exceed ¼ of its diameter. For example, a plano-concave lens having a diameter of 48 mm., should have a center thickness ranging from 3 mm. to 12 mm. A center thickness above this critical size would produce a magnified but somewhat distorted image.

It is evident that numerous modifications will become apparent to those skilled in the art without departing from the spirit and scope of this invention. Further, as this invention may be advantageously employed regardless of the particular type of primary lens system 21 available, the description hereinabove set forth is not intended in a limiting sense but merely description of the invention as defined in the appended claim.

I claim:

In an optical apparatus the combination of an image receiving screen, a projector including a light source positioned at a predetermined distance from said screen, a lens system comprising a condenser and primary lens means operatively interposed between said source and the screen and means for supporting a transparency in operative position between said condenser and said primary lens means, and a diaphragm defining a small aperture positioned between said supporting means and said primary lens means whereby an image of a predetermined size is projectable on said screen through a transparency operatively positioned in relation to said supporting means, a magnifying element, means mounted on said projector for supporting the magnifying element in operative relation to and coaxially with said lens system, said magnifying element comprising a negative diopter lens of plano-concave cross-sectional contour mounted on said supporting means and effectively positioned between the focal point of said primary lens means and the screen and with its concave face directed toward said primary lens means, said magnifying element being adjustable axially in relation to said primary lens means to and from operative positions between said focal point and the screen, thereby to magnify said image of predetermined size to an image on the screen of controllably variable larger sizes without varying the distance between the light source and the screen, and said primary lens means being adjustable for focusing the image on said screen independently of said magnifying element.

References Cited by the Examiner
UNITED STATES PATENTS

| | | | |
|---|---|---|---|
| 953,879 | 4/10 | Williams | 88—57 |
| 1,863,099 | 6/32 | Bowen | 88—57 X |
| 1,960,577 | 5/34 | Dirkes | 88—24 |
| 2,175,185 | 10/39 | Ellsworth | 352—39 |
| 2,729,141 | 1/56 | Walker | 88—57 X |

NORTON ANSHER, *Primary Examiner.*

EMIL G. ANDERSON, ROBERT L. EVANS, *Examiners.*